US007031962B2

(12) United States Patent
Moses

(10) Patent No.: US 7,031,962 B2
(45) Date of Patent: Apr. 18, 2006

(54) SYSTEM AND METHOD FOR MANAGING OBJECTS AND RESOURCES WITH ACCESS RIGHTS EMBEDDED IN NODES WITHIN A HIERARCHICAL TREE STRUCTURE

(75) Inventor: Fred Moses, Newton, MA (US)

(73) Assignee: BEA Systems, Inc., San Jose, CA (US)

( * ) Notice: Subject to any disclaimer, the term of this patent is extended or adjusted under 35 U.S.C. 154(b) by 216 days.

(21) Appl. No.: 10/107,949

(22) Filed: Mar. 27, 2002

(65) Prior Publication Data
US 2003/0061216 A1 Mar. 27, 2003

Related U.S. Application Data

(60) Provisional application No. 60/279,041, filed on Mar. 27, 2001, now abandoned.

(51) Int. Cl.
*G06F 17/30* (2006.01)
*G06F 7/00* (2006.01)

(52) U.S. Cl. ............... 707/9; 707/6; 707/10; 707/102; 707/104.1; 709/201; 709/202; 709/203; 709/219; 709/225

(58) Field of Classification Search ............... 707/2–6, 707/9, 10, 102, 104.1; 709/217–219, 201–203, 709/228, 225, 216; 713/200–202
See application file for complete search history.

(56) References Cited

U.S. PATENT DOCUMENTS

| 5,469,576 | A | * | 11/1995 | Dauerer et al. ............ 713/200 |
| 5,778,222 | A | * | 7/1998 | Herrick et al. ................. 707/9 |
| 5,878,415 | A | | 3/1999 | Olds ............................. 707/9 |
| 5,889,952 | A | * | 3/1999 | Hunnicutt et al. .......... 709/219 |
| 5,999,978 | A | * | 12/1999 | Angal et al. ................. 709/229 |
| 6,016,499 | A | * | 1/2000 | Ferguson .................. 707/104.1 |
| 6,038,563 | A | | 3/2000 | Bapat et al. ................... 707/10 |
| 6,061,684 | A | * | 5/2000 | Glasser et al. ................. 707/9 |
| 6,154,741 | A | * | 11/2000 | Feldman ........................ 707/9 |
| 6,260,039 | B1 | * | 7/2001 | Schneck et al. ............... 707/10 |
| 6,553,368 | B1 | * | 4/2003 | Martin et al. ................... 707/3 |
| 6,772,350 | B1 | * | 8/2004 | Belani et al. ................ 713/202 |
| 6,901,426 | B1 | * | 5/2005 | Powers et al. .............. 709/203 |
| 2002/0143521 | A1 | * | 10/2002 | Call .............................. 704/1 |

OTHER PUBLICATIONS

E. Damiani et al.: "Design and implementation of an access control processor for XML documents", Jun. 2000,Computer Networks, Elsevier Science Publichers B.V., Amsterdam, NL, vol. 33, No. 1-6, pp. 59-75.*
Notification of Transmittal of the International Search Report for Corresponding PCT Application PCT/US02/09504.
Ernesto Damiani, et al., "Design and implementation of an access control processor for XML documents", *Computer Networks* 33, 59-75 (2000).

* cited by examiner

*Primary Examiner*—Jeffrey Gaffin
*Assistant Examiner*—Jacques Veillard
(74) *Attorney, Agent, or Firm*—Choate,Hall & Stewart LLP

(57) ABSTRACT

A system and method for controlling access to data within a hierarchically organized document, such as an XML document. Elements may have their access rights specified, for example as a variable in an XML tag. If not specified within an element of the document, access rights are inherited from its nearest ancestor. Specified access rights may refer to a collection of entitlement expressions, which describe with arbitrarily fine granularity which users and user types may access the data.

8 Claims, 4 Drawing Sheets

FIG.4

EntitlementIDs:
<entitlementID ID="E1" V="doctors+nurses"/>
<entitlementID ID="E2" V="lab Techs"/>

XML Text:
<A entitlement="E1">
    <B> ... </B>
    <C entitlement="E2">
        <D> ... </D>
    </C>
</A>

| Element | Entitlement |
|---------|-------------|
| A | E1 |
| B | E1 |
| C | E2 |
| D | E2 |

SYSTEM AND METHOD FOR MANAGING OBJECTS AND RESOURCES WITH ACCESS RIGHTS EMBEDDED IN NODES WITHIN A HIERARCHICAL TREE STRUCTURE

The present application claims benefit of U.S. Provisional Application No. 60/279,041, filed Mar. 27, 2001, which is incorporated herein by reference.

FIELD OF THE INVENTION

The present invention provides a system and method for managing objects and resources with access rights embedded in nodes within a hierarchical tree structure. The system is suitable for implementation of HL7 -approved XML standards for medical records and/or messages.

BACKGROUND OF THE INVENTION

Controlling the access of a large number of users to a vast array of data represents one of the greatest challenges facing the future of the Internet. One example of an immense access control undertaking that will exceed the capabilities of current access control systems relates to the provisions of the Health Insurance Portability and Accountability Act of 1996 (HIPAA).

HIPAA will be implemented in accordance with a Rule (Federal Register/Vol. 65, No. 250/Thursday, Dec. 28, 2000/ Rules and Regulations p. 82462, 45 CFR Parts 160 and 164, Rin: 0991-AB08, Standards for Privacy of Individually Identifiable Health Information) promulgated by the Department of Health and Human Services (HHS) in an effort to achieve the adoption of industry standards for the electronic transmission of health information. In short, HIPAA requires that all patient information transfers between organizations be in a standardized form and that standards of privacy be maintained. Health Level 7 (HL7) is an organization that creates the standards for storage and interchange of medical records encompassed by HIPAA. Standardization complications include the fact that there are currently about 400 formats for electronic health care claims processing in use nationwide. Further, the need to manage this information will require finely granular (down to the per field level) access to a massively scaled number of records. This access must obey the mandated confidentiality and respect specific patient confidentiality requests.

HL7 has chosen the eXtensible Markup Language (XML) as the basis for structuring medical records for storage and messaging. This language organizes data as a tree structure documents. XML is standardized by W3C, (http://www.w3.org/TR/REC-xml). W3C is an international industry consortium responsible for developing common code standards for the World Wide Web.

Applications storing or transferring medical records will require access control mechanisms to assure that HIPAA requirements are met. It is an object of the present invention to supply this need.

U.S. Pat. No. 6,061,684, "Method and system for controlling user access to a resource in a networked computing environment," assigned to Microsoft Corporation (Redmond, Wash.), describes a unified and straightforward approach to managing file and other resource security in a networked computing environment. The invention can be implemented in a multi-user computer network that includes a client computer, a server computer that controls a resource sharable among users of the network, such as a shared file folder or directory, and a communications pathway between the client computer and the server computer. The resource is organized as a hierarchy of elements with a root element at the top of the hierarchy and additional elements below the root element. According to the invention, a request is received to change a protection, such as an access permission, of an element of the resource hierarchy (other than the root) with respect to a particular network user. If the element in question lacks an associated access control list, a nearest ancestor element of the hierarchy is located that has an associated access control list. The first (descendant) element inherits the access control list of the second (ancestor) element. This inheritance is done by generating a copy of the access control list of the second element and associating the generated copy with the first element. The requested change in protection is then incorporated into the generated copy that has been associated with the first element so as to establish an updated access control list for the first element. Further, the requested change can be propagated downwards in the hierarchy from the first element to its descendants having access control lists.

U.S. Pat. No. 6,038,563, "System and method for restricting database access to managed object information using a permissions table that specifies access rights corresponding to user access rights to the managed objects," assigned to Sun Microsystems, Inc. (Palo Alto, Calif.), describes an access control database that specifies access rights by users to specified sets of the managed objects. The specified access rights include access rights to obtain management information from the network. An access control server provides users access to the managed objects in accordance with the access rights specified by the access control database. An information transfer mechanism sends management information from the network to a database management system (DBMS) for storage in a set of database tables. Each database table stores management information for a corresponding class of managed objects. An access control procedure limits access to the management information stored in the database tables using at least one permissions table. A permissions table defines a subset of rows in the database tables that are accessible to at least one of the users. The set of database table rows that are accessible corresponds to the managed object access rights specified by the access control database. A user access request to access management information in the database is intercepted, and the access control procedure is invoked when the user access request is a select statement. The database access engine accesses information in the set of database tables using the permissions tables such that each user is allowed access only to management information in the set of database tables that the user would be allowed by the access control database to access.

U.S. Pat. No. 5,878,415, "Controlling access to objects in a hierarchical database," assigned to Novell, Inc. (Provo, Utah), describes methods and systems for controlling access to objects in a hierarchical database. The database may include a directory services repository, and/or synchronized partitions. An access constraint propagator reads an access control property of an ancestor of a target object. The access control property designates an inheritable access constraint such as an object class filter or an "inheritable" flag. The object class filter restricts a grant of rights to objects of an identified class. The "inheritable" flag allows inheritance of an access constraint on a specific object property. The propagator enforces the inheritable access constraint by applying it to at least the target object.

SUMMARY OF THE INVENTION

In one aspect, the present invention comprises a system for managing objects and resources with access rights embedded in nodes within a hierarchical tree-structure. The system includes a host, housing a Web server, a database server, an entitlement server, and a transaction server; a network, such as the Internet or an intranet; and one or more client PCs.

In another aspect, the present invention comprises a method of inputting a transaction in XML form for use in the determination and granting of access rights embedded in nodes within a hierarchical tree structure. The method includes receiving transaction data from the external system; parsing and validating the XML; determining whether the received data is valid; adding access data to the entitlement server and text content to the database server; determining whether an error occurred; sending an error message to the external system; and sending a confirmation message to the external system.

In yet another aspect, the present invention comprises a method of interacting with a host system into which an XML document has been accepted. The method includes identifying the user accessing the host using a client PC; receiving a request; determining whether an access check is needed; determining whether permission should be granted; performing the request; replying to the user; and handling the denial of the request.

One advantage of the present invention is that it provides a way to protect objects described by a tree structure.

A second advantage of the present invention is that it provides a way to protect objects with as much granularity as the tree structure permits.

A third advantage of the present invention is that it provides a way to protect objects with as much granularity as the set of users permits.

A fourth advantage of the present invention is that the entitlement IDs (or expressions or objects) can be defined in a diverse ways, allowing for a wide variety of applications.

A fifth advantage of the present invention is that the entitlement IDs may be collected separately, meaning that they do not need to be sprinkled throughout the code structure. They can be cached before the XML is parsed, leading to improved system speed and efficiency.

A sixth advantage of the present invention is that may be packaged either as a separate XML document or as a separate part of the document containing the objects to protect.

BRIEF DESCRIPTION OF THE DRAWING

The invention is described with reference to the several figures of the drawing, in which.

FIG. 4 illustrates the used of XML to manage objects and resources in a hierarchy with access rights embedded in some nodes.

DETAILED DESCRIPTION

Figure 1:
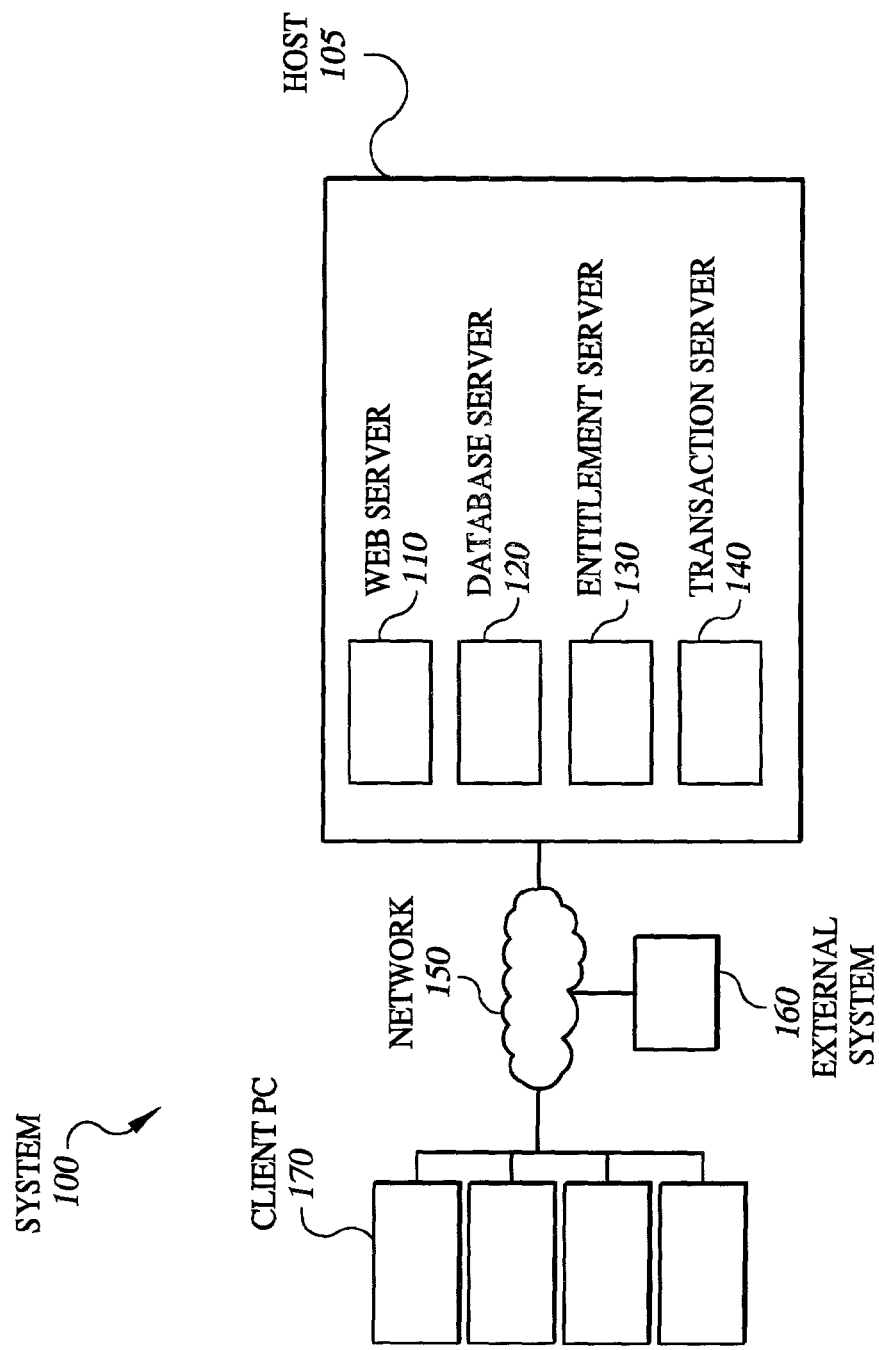
FIG. 1 shows a system for managing objects and resources in a hierarchy with access rights embedded in nodes.

FIG. 1 illustrates a system for managing objects and resources in a hierarchy with access rights embedded in nodes. System 100 includes a host 105, comprising a Web server 110, a database server 120, an entitlement server 130, and a transaction server 140, which are all interconnected within host 105. Host 105 can be either a single computer, or a series of computers operating in concert. System 100 also includes connections to a network 150 (such as the Internet or an intranet), through which an external system 160, and one or more client PCs 170 connect with host 105.

In some embodiments of the invention, external system 160 and client PCs 170 use network 150 to communicate with host 105 for the purposes of generating and receiving documents programmed in XML. In other embodiments, client PCs 170 need never actually create or access XML directly. Instead, web server 110 invokes transaction server 140 to request text from an XML document, and then transforms the text into HTML to send back to the client PC 170.

Typically, client PC 170 is a personal computer. External system 160 may be a peer to host 105 or a host-type system of wholly separate elements; however, external system 160 must contain an application capable of generating and translating XML. Host 105 represents a network-connected host environment consisting of one or more servers. Web server 110, which may be a single server or multiple servers operating in a cluster, executes the functions associated with serving World Wide Web pages. Database server 120 stores the actual content of the XML transactions and is called upon by other elements of host 105 for such content. The internal form of the content need not be XML as long as the tree structuring information is preserved. Entitlement server 130 operates as one type of a database server dedicated to hosting and adjudicating access control for applications served by host 105. The functionality of one suitable entitlement server 130 is fully described in U.S. Pat. No. 6,154,741 to Feldman, which is assigned to EntitleNet, Inc., and incorporated herein by reference. Transaction server 140 functions as the XML interpreter, and houses various software applications for that purpose, including those that pass portions of submitted XML documents to entitlement server 130 and database server 120 for storage. Transaction server 140 also receives transaction results from entitlement server 130 and database server 120 and responds accordingly to the transaction's requestor. In addition, transaction server 140 governs the retrieval of requested portions of XML documents.

Figure 2:
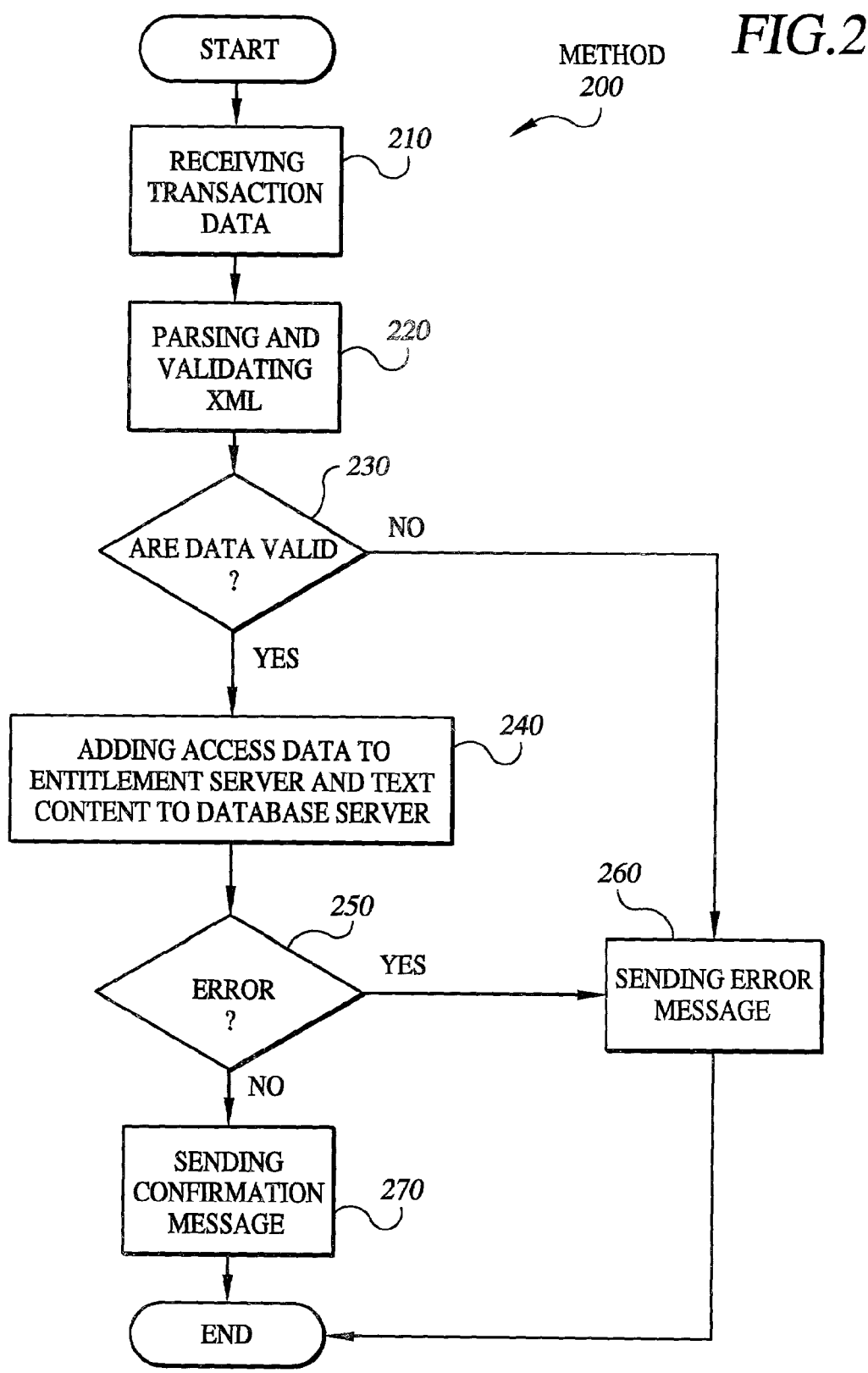
FIG. 2 is a flow chart illustrating a method of inputting a transaction in XML form.

FIG. 2 is a flowchart illustrating a method of inputting a transaction in XML form. Entitlement information within the XML affects the exchange with respect to the way permission to access information is granted. Method 200 includes the following steps:

Step 210: Receiving Transaction Data

In this step, transaction server 140 receives an XML document with associated transaction data generated by external system 160. External system 160 sends this XML document to transaction server 140 via network 150.

Step 220: Parsing and Validating XML

In this step, transaction server 140 parses the received XML document to check for validity using software applications and techniques well known in the art.

Step 230: Are the Data Valid?

In this decision step, transaction server 140 determines whether the XML document is valid. If yes, process 200 proceeds to step 240; if no, process 200 proceeds to step 260.

Step 240: Adding Access Data to Entitlement Server and Text Content to Database Server In this step, transaction server 140 translates the information parsed in step 220 into the appropriate internal form and stores it on entitlement server 130 and database server 120. In particular, access information is added to entitlement server 130, and the text information is saved to database server 120. In addition, some tracking information is added to database server 120 to track the processing performed.

Step 250: Did an Error Occur?

In this decision step, transaction server 140 checks to see if any errors occurred thus far. If yes, process 200 proceeds to step 260; if no, process 200 proceeds to step 270.

Step 260: Sending Error Message

In this step, transaction server 140 sends an error message back to the originating external system 160 via network 150, and processing ends.

Step 270: Sending Confirmation Message

In this step, transaction server 140 sends a confirmation message back to originating external system 160 via network 150, and processing ends.

Figure 3:
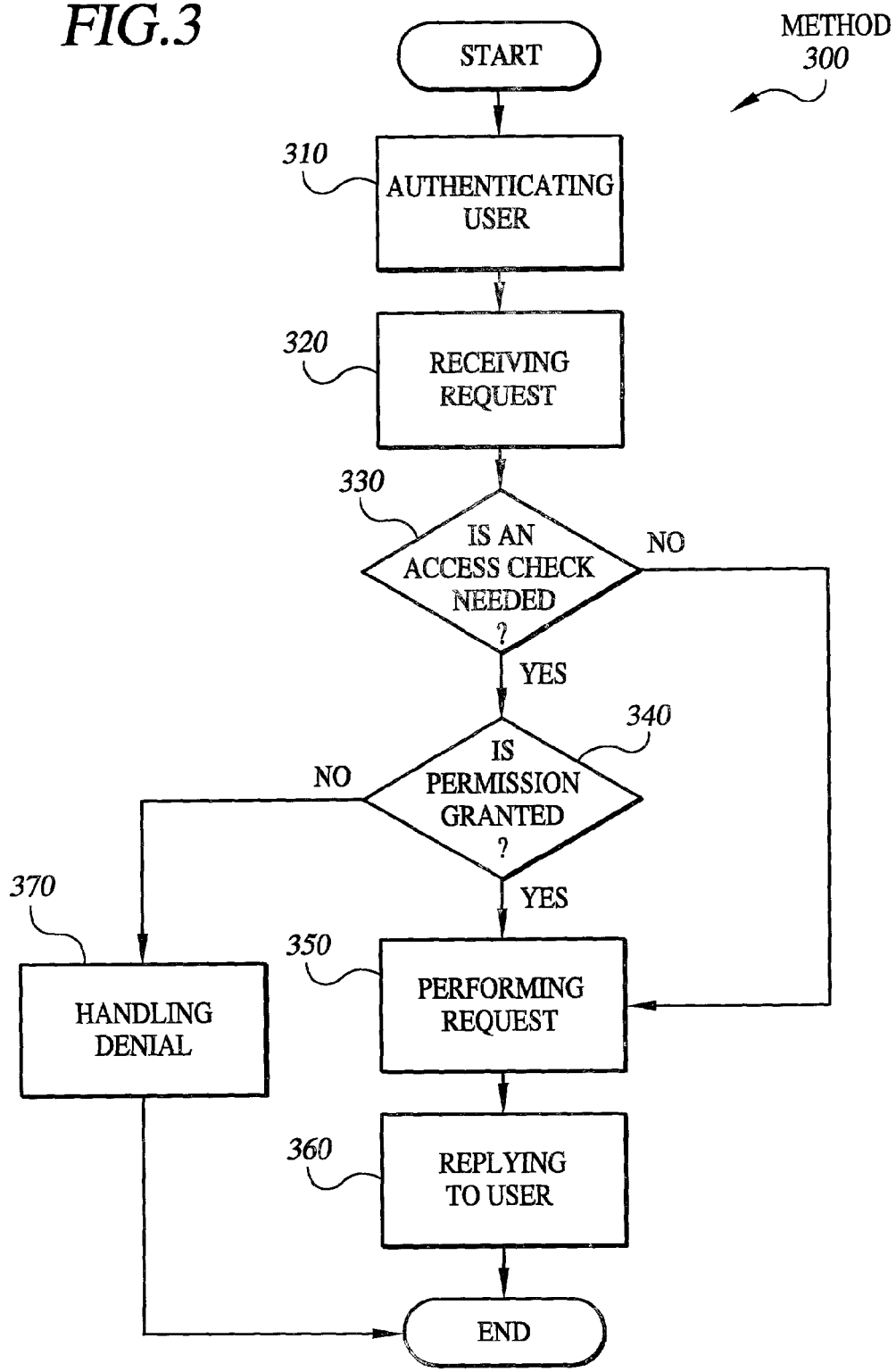
FIG. 3 is a flow chart illustrating a method of interacting with a host system into which the XML document has been accepted.

FIG. 3 is a flowchart illustrating a method of interacting with a host system into which the XML document has been accepted. While FIG. 2 covered the programmatic interface with host 105 using external system 160, FIG. 3 instead covers the interaction of client PCs 170 with host 105. Method 300 includes the following steps:

Step 310: Authenticating User

In this step, Web server 110 authenticates users on client PC 170 talking to host 105 using network 150 and applications known in the art, such as using a secure socket layer interchange.

Step 320: Receiving Request

In this step, Web server 110 receives a request for information from a user using Web-browsing software installed on client PC 170.

Step 330: Is an Access Check Needed?

In this decision step, Web server 110 determines whether the information request requires an access control check. If yes, process 300 proceeds to step 340; if no, process 300 proceeds to step 380.

Step 340: Is Permission Granted?

In this decision step, entitlement server 130 determines whether to grant access based on user identification obtained in step 310 and the access check performed in step 330. If yes, process 300 proceeds to step 350; if no, process 300 proceeds to step 370.

Step 350: Performing Request

In this step, entitlement server 130 performs the request received from Web server 110. The performance of this request (or adjudication) is fully described in U.S. Pat. No. 6,154,741 assigned to EntitleNet, Inc.

Step 360: Replying to User

In this step, Web server 110 sends a reply to the request for information originating from client PC 170 via network 150, and processing ends.

Step 370: Handling Denial

In this step, Web server 110 handles the denial of access to information (i.e., the user on client PC 170 is not allowed to receive the information requested) by communicating with client PC 170 via network 150, and processing ends.

FIG. 4 illustrates the use of XML to manage objects and resources in a hierarchy with access rights embedded in some nodes. An entitlementID element creates a BMAP object with a name given by the ID attribute and entitles it with the entitlement expression given by the V attribute. (The names are arbitrary and chosen for the purposes of exposition.) An arbitrary number of these may be defined to yield any desired granularity.

An entitlement attribute within an element specifies the entitlementID governing the element. Entitlements are enforced in a tree-oriented manner with lower or enclosed elements of the tree governed by the enclosing nodes. An exception to this is that an entitlement attribute on an element supercedes the entitlement of higher nodes. This presents two constructs which, when used in concert, allow the specification of the control of access to portions of an XML data structure.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A system for providing information to users selectively according to predetermined access rights, the system comprising:

a database of records, the records being hierarchically organized into elements, at least some of the elements comprising access rights information;

an entitlement server comprising a membership map describing user membership in access groups; and a transaction server that consults the database and the entitlement server and serves information to users in response to requests only if users are allowed to access the information, said transaction server processing a received document including one or more of said elements wherein said access rights information is included as an attribute in a definition for each of said at least some of the elements in said received document, wherein said transaction server includes an interpreter which passes a first portion of a submitted document corresponding to first access rights information to said entitlement server, and a second portion of said submitted document corresponding to text information of a first data element associated with said first access rights information, access to said text information being granted to a requestor in accordance with said first access rights.

2. The system of claim 1, wherein the records are XML documents.

3. The system of claim 2, wherein the XML documents comply with HIPAA standards.

4. The system of claim 1, wherein access rights to an element are controlled by access rights information embedded therein if such access rights information exists, and by access rights information embedded in the first ancestor element having such access rights information if the element does not comprise embedded access rights information.

5. The system of claim 1, wherein the access rights information is an entitlement expression.

6. The system of claim 1, wherein the membership map is a bit map.

7. The system of claim 1, wherein the transaction server serves an XML document comprising only elements for which the user has access rights.

8. The system of claim 1, wherein the transaction server uses an XML document having access rights information embedded therein to build an HTML document comprising only elements for which the user has access rights, and serves the HTML document to the user.

* * * * *